Oct. 24, 1967    L. W. GATES ETAL    3,348,647
FRUIT DEPOSITING DEVICE FOR HARVESTER
Filed July 18, 1966    2 Sheets-Sheet 2
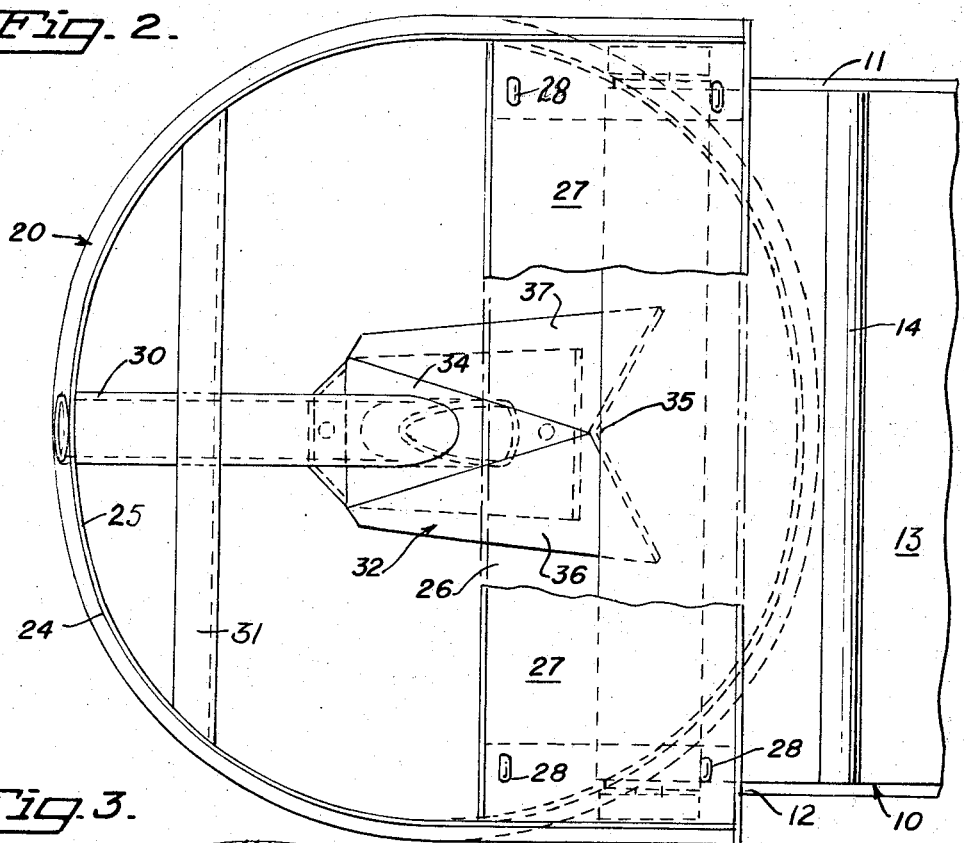
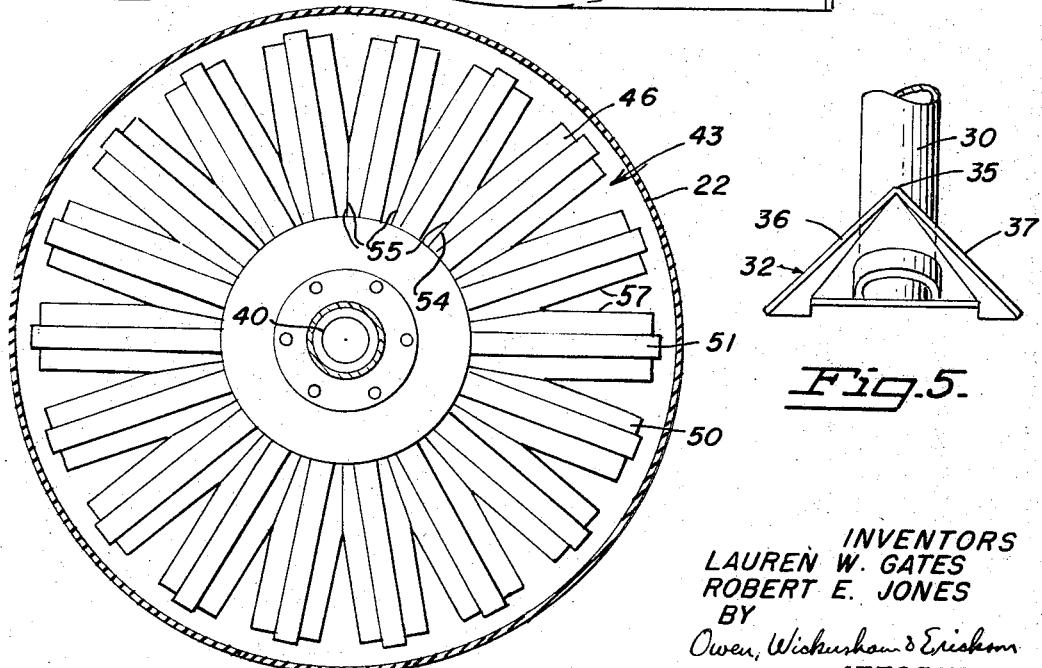
INVENTORS
LAUREN W. GATES
ROBERT E. JONES
BY
Owen, Wickersham & Erickson
ATTORNEYS

United States Patent Office 3,348,647
Patented Oct. 24, 1967

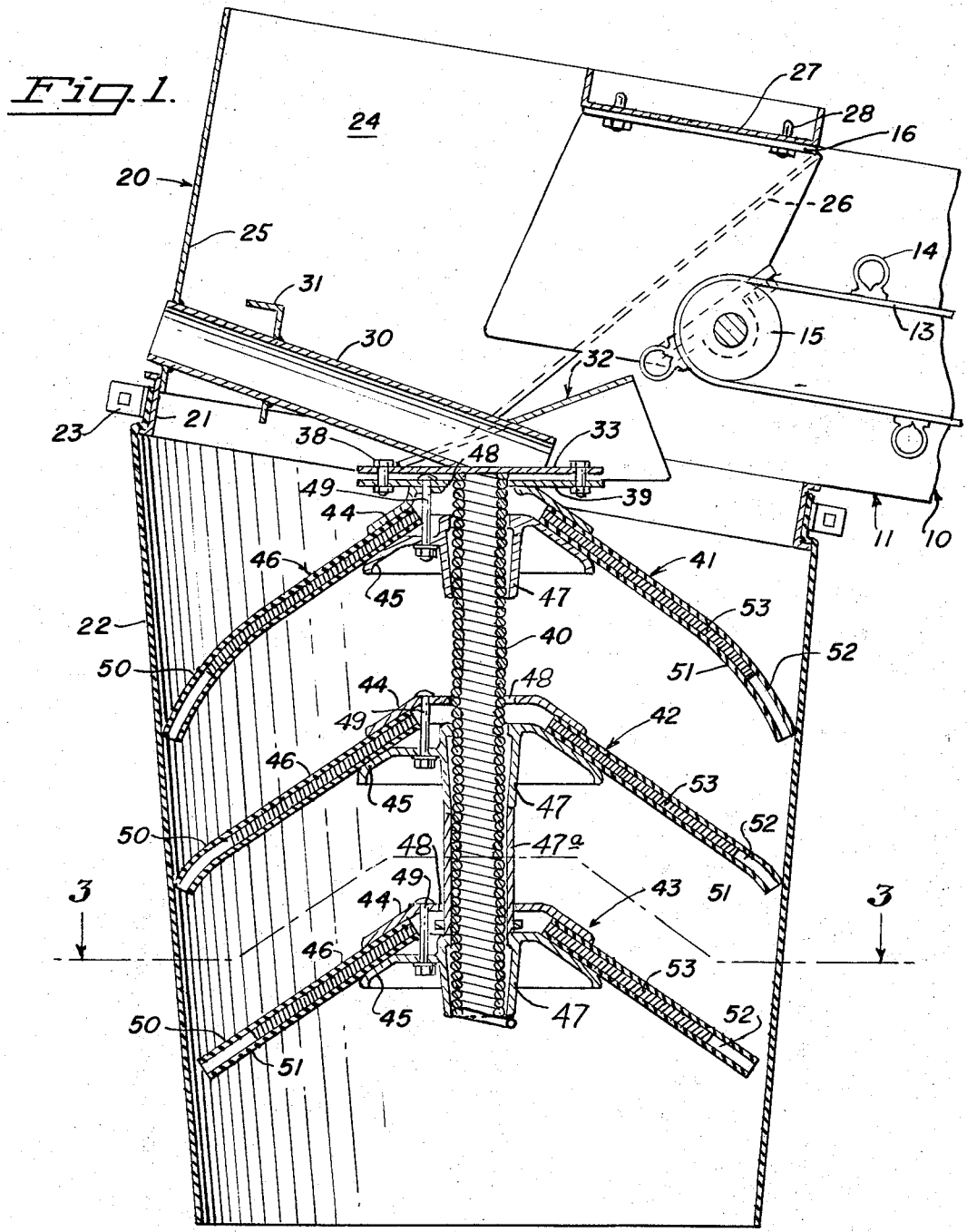

3,348,647
FRUIT DEPOSITING DEVICE FOR HARVESTER
Lauren W. Gates, Stockton, and Robert E. Jones, Rio Vista, Calif., assignors to The Regents of the University of California, Berkeley, California
Filed July 18, 1966, Ser. No. 565,830
16 Claims. (Cl. 193—7)

This invention relates to an improved fruit-depositing device for use with tomato harvesters and similar harvesting devices.

This invention may be considered as an improvement over U.S. Patent 3,187,872 to Frederick L. Hill and Lauren W. Gates, which, while it performs very satisfactorily, is limited in the amount of fruit it can handle per minute. The present device can handle a much greater quantity of fruit per unit time. Like the device of that patent, it is used as a discharge chute or depositing device for receiving fruit from an output conveyor leading from the harvester and for depositing the fruit in containers, such as large tractor-moved trailers or bins in which the fruit is subsequently taken to a cannery. As in the prior device, a significant problem is to lower the fruit gently into the bins or other containers without damaging the fruit, and like that device it takes care of that problem, while doing so at great flow volume, distributing hundreds of tomatoes each minute and handling several times the quantity of the previous device.

Another problem with which the invention is concerned is how to provide a unit which is compact and still is able to handle an increased number of tomatoes. The present invention, while taking up very little more space than did the previous device and able to operate with the same type of conveyor structure, does handle a greatly increased quantity.

Another problem is to provide means preventing damage to both the device and the bins, in the event that the device strikes against the walls of the bin.

Another significant problem solved by the invention is that of converting the flow of tomatoes from a linear conveyor into a distribution pattern efficiently employing the full capability of the device. The device distributes the fruit to the periphery, preferably circular, and thereby greatly increases the working area, as compared with the former devices.

Another object of the invention is to eliminate the need for adjustments when different fruit sizes and different volume rates are concerned.

Other objects and advantages of the invention will appear from the following description of a preferred form of the invention.

In the drawings:

FIG. 1 is a view in side elevation and in section of a fruit depositing device embodying the principles of the invention, shown mounted adjacent and supported by the end of a beam-like conveyor.

FIG. 2 is a top plan view of the device and the portion of the conveyor shown in FIG. 1.

FIG. 3 is a view in horizontal section taken along the line 3—3 in FIG. 1.

FIG. 4 is a view in perspective looking at the bottom of one of the flexible flaps.

FIG. 5 is a view taken along the line 5—5 in FIG. 1.

The device is used, usually, in conjunction with an output conveyor 10, such as typically extends out to one side of a harvesting machine, which supports it for adjustment of the height of the output end. The conveyor 10 may, for example, have a metal frame 11 with a pair of side members 12 between which runs a flighted belt 13 with cross members or flights 14 that enable upward movement of the tomatoes. The belt 13 may be driven by a roller (not shown) at the inboard end of its loop, and typically has an idling roller 15 at its outboard end. As the belt 13 moves around the roller 15, the tomatoes (or other fruit) drop off the belt 13 into a fruit depositing device 20 forming the subject matter of the present invention. The purpose of the device 20 is to gently place the tomatoes into a bin that is moved on a wheeled frame alongside the harvester, usually by a separate powered vehicle, and to do this with minimum damage to the tomatoes or other fruit being harvested, while handling them in quantities.

The device 20 includes a rigid ring 21 from which depends a flexible skirt 22 which is clamped to the ring 21 by a clamping ring 23. The flexible skirt 21 may comprise sheet rubber or rubberized fabric or suitable fabric, and in any event is designed to be relatively light in weight and quite flexible so that it cannot be damaged if it does strike against the walls of the bin.

The ring 21 is secured to an upper hopper-like structure 24 which has a semicircular wall 25 on the opposite side of the device 20 from the conveyor belt 13 and may have a strengthening outer flange 26 on the side next to the conveyor 10. A plate 27 extends across the machine and is secured to a flange 16 of the conveyor frame 11 by bolts 28, thereby supporting the device 20. The hopper-like member 24 serves to confine the tomatoes, to prevent them from falling outside the tomato depositing device 20 and also helps to guide the tomatoes.

A pipe-like support member 30 is secured to the hopper wall 25 and is directly in line with the axis of the conveyor 10. To the member 30 is secured a strengthening member 31, which helps to support it by connecting it to other portions of the wall 25. The member 30 also carries a fruit distributing device 32 and a disc plate 33. The device 32 comprises a metal member shaped to provide a portion 34 which slopes downwardly and flares outwardly from a point 35 and backwardly and outwardly sloping side portions or wings 36 and 37. This helps to divert some of the tomatoes in a direction opposite to the direction of movement of the conveyor belt 13 and to distribute them out to the sides. Since the prime, inertial motion of the tomatoes is directly in line with the pipe 30 and toward the semicircular wall 25, the device 20 uses several expedients to divert the tomatoes from this normal path, as by the contrary sloping and outwardly sloping wings 36 and 37 to send the fruit so that an approximately even distribution is achieved, the ideal being to disperse the fruit evenly around the complete 360 degrees.

To the disc 33, which is central of the machine, is secured a second plate-like disc 39 by suitable bolts 38. The disc 39 is itself secured, as by welding, to a relatively rigid close-wound coil spring 40. This spring 40 retains a strong tendency to stay nearly rigid along the central vertical axis of the device 20, and it is not diverted by the flow of tomatoes, but it is yieldable if struck by the walls of the bin or by some other substantial force.

A plurality of fruit-delaying means 41, 42, 43 are spaced vertically down the coil spring 40. The top fruit delaying means 41 (three being shown in this preferred embodiment though there may be more or fewer) is supported rigidly, being bolted to the disc 37, while the other two 42 and 43 are supported directly by the coil spring 40 and move with it when it flexes.

Each of these fruit delaying means 41, 42, 43 includes a pair of generally conically formed clamps 44, 45 bolted together, clamping between them a series of outwardly extending flexible flaps 46. As will be seen, the lower conical clamp member 45 is provided with a sleeve portion 47 that goes around the coil spring 40 and the upper clamp member has an opening 48 through which the coil spring 40 passes. The clamp members 44 and 45 are secured together by a plurality of bolts 49, and in the instance of the top means 41, the bolt 49 secures it to the disc 37. The bottommost sleeve 47 rests on the lower end of the spring 40, and an auxiliary sleeve 47a spaces the unit 42 from the unit 43.

The resilient flaps 46 each comprise rubber members having a flat upper surface 50 and having a depending centrally extending portion 51 with a tubular opening 52 therethrough. In this is inserted a coil spring 53, which does not extend all the way to the outer end of the opening 52 but preferably extends out a substantial distance toward the end; the spring 53 stiffens the flap 46 and keeps it from gradually taking a permanent set or deformation without any remaining resiliency. The flaps 46 are shaped to provide an inner sectoral section 54 in which their walls 55 substantially abut each other all the way around, extending out in a true radial direction, and then an outer section 56 in which the walls 57 diverge from their adjacent members, this portion 56 having substantially parallel walls 57.

In a preferred structure of the invention, the two upper of the delaying means have longer outer fingers 46 actually engaging the skirt 22 and forced down thereby, whereas the lowermost set of fingers 46 stop short of the skirt 22. It will be noted that all of the flaps 46 are directed downwardly, and the relationship between the skirt 22 and the flaps 46 is such that a tomato (or whatever fruit is being harvested) cannot directly fall down between the flaps 46 or between the flaps 46 and the skirt 22.

In operation, the fruit coming in over the flighted conveyor 13 falls off the end onto the fruit diverting device 32 and is diverted there to each side and rearwardly of the stream of fruit. It then falls down onto the top of the first fruit delaying means 41. One tomato usually will not be sufficient to bend a flap 46 down enough so that the tomato can fall through, but the subsequent combined weight of several tomatoes eventually does force the flap 46 down, and then the flap 46 bends down sufficiently to let the fruit fall down to the next fuit delaying means 42, where the action is repeated until it falls down to the third fruit-delaying means 43, from which the fruit is dropped directly into the bin, a very short distance. The operator can manipulate this device so that the device distributes it over the bin, and the conveyor 10 is gradually raised to keep the last drop small. When there is a large quantity of fruit passing through the device 20, the flaps 46 may be kept permanently diverted down, but then the tomatoes are simply let down gently on top of each other into the bin itself.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:
1. A fruit depositing device, including in combination hopper means,
a skirt suspended from said hopper means,
fruit-delaying means supported by said hopper means centrally with respect to said skirt and having a series of radially outwardly extending flexible flaps extending toward said skirt and in relation thereto such that descending fruit must flex at least one said flap in order to descend further.

2. The device of claim 1 having means for dispersing fruit, secured to said hopper means above the top of said fruit delaying means, to help to distribute incoming fruit around the device.

3. The device of claim 1 wherein there are a plurality of vertically-separated fruit-delaying means.

4. The device of claim 2 wherein the lower of said fruit-delaying means is mounted on a stiff coil spring.

5. The device of claim 1 wherein said skirt is flexible.

6. A fruit depositing device, including in combination a support ring,
a skirt suspended from said ring,
a central shaft, centered relative to said ring and skirt,
means connecting said ring to said shaft for support of said shaft,
a plurality of fruit-delaying means secured to said shaft and vertically spaced from each other,
each said fruit delaying means comprising
a series of flexible flaps radially arranged around said shaft and extending toward said skirt and in relation thereto such that descending fruit must flex at least one said flap in order to descend further.

7. The device of claim 6 having means for dispersing fruit, secured to said ring above the top said fruit delaying means, to help to distribute incoming fruit around the device.

8. A fruit depositing device, including in combination a hopper member,
a support ring secured to the bottom of said hopper member,
a flexible skirt suspended from said ring,
a flexible central shaft, centered relative to said ring and skirt,
means connecting said hopper member to said shaft for support of said shaft,
a plurality of fruit-delaying means secured to said shaft and vertically spaced from each other,
each said fruit-delaying means comprising
a series of flexible flaps radially arranged around said shaft and extending toward said skirt and in relation thereto such that descending fruit must flex at least one said flap in order to descend further.

9. The device of claim 8 having means for dispersing fruit, secured to said hopper member above the top said fruit-delaying means, to help to distribute incoming fruit around the device.

10. The device of claim 8 wherein fruit is delivered to said device by linear conveying means tending to send fruit to one side only of said device, comprising also a fruit distributing means secured to said ring above said fruit-delaying means and including a plate having a central sloping portion and two generally oppositely and outwardly sloping side portions, and a pipe-like member securing said fruit distributing means to said ring and extending in the path of said fruit in line with said conveying means to prevent direct deposition of the fruit, and a baffle on said pipe-like member to divert the fruit out away from said pipe.

11. The device of claim 8 wherein said flexible shaft comprises a stiff coil spring on which all of said fruit-delaying means except the top one are mounted, the top one being mounted on a rigid member.

12. The device of claim 8 wherein each said flexible flap comprises a narrow rubber segment having outwardly flaring sector walls touching its adjacent flaps and substantially parallel outer walls spaced from the adjacent flaps.

13. The device of claim 12 wherein each said flap has a depending tubular portion in which is seated a coil spring.

14. A fruit depositing device, including in combination hopper means,
a flexible skirt suspended from said hopper means,
a plurality of vertically separated fruit-delaying means supported by said hopper means centrally with respect to said skirt and having a series of radially outwardly extending flexible flaps extending toward said skirt and in relation thereto such that descending fruit must flex at least one said flap in order to descend further.

15. The device of claim 14 having means for dispersing fruit, secured to said hopper means above the top of said fruit delaying means, to help to distribute incoming fruit around the device.

16. The device of claim 14 wherein the lower of said fruit-delaying means is mounted on a stiff coil spring.

References Cited

UNITED STATES PATENTS

| | | | |
|---|---|---|---|
| 1,276,453 | 8/1918 | Tussing | 193—7 |
| 3,187,872 | 6/1965 | Hill et al. | 193—7 |

ANDRES H. NIELSEN, *Primary Examiner.*